United States Patent
Liu et al.

(10) Patent No.: US 10,728,921 B2
(45) Date of Patent: Jul. 28, 2020

(54) INFORMATION PROCESSING METHOD AND DEVICE

(71) Applicant: HUAWEI TECHNOLOGIES CO., LTD., Shenzhen, Guangdong (CN)

(72) Inventors: Zhe Liu, Beijing (CN); Xingwei Zhang, Beijing (CN); Chao Li, Beijing (CN); Jie Shi, Shenzhen (CN); Yinghua Sun, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/266,102

(22) Filed: Feb. 3, 2019

(65) Prior Publication Data
US 2019/0174521 A1 Jun. 6, 2019

Related U.S. Application Data

(63) Continuation of application No. PCT/CN2016/094724, filed on Aug. 11, 2016.

(51) Int. Cl.
*H04W 72/12* (2009.01)
*H04W 72/04* (2009.01)
(Continued)

(52) U.S. Cl.
CPC ......... *H04W 72/1278* (2013.01); *H04L 1/007* (2013.01); *H04W 28/02* (2013.01);
(Continued)

(58) Field of Classification Search
CPC . H04W 72/00; H04W 72/02; H04W 72/0446; H04W 72/10; H04W 72/12;
(Continued)

(56) References Cited

U.S. PATENT DOCUMENTS

2011/0081932 A1* 4/2011 Astely ............... H04W 72/1273
455/509
2011/0249641 A1* 10/2011 Kwon ............... H04W 74/0833
370/329
(Continued)

FOREIGN PATENT DOCUMENTS

CN 101170809 A 4/2008
CN 102045854 A 5/2011
(Continued)

OTHER PUBLICATIONS

LG Electronics: "Discussion on sPUSCH design with TTI shortening", 3GPP DRAFT; R1-164544, vol. RANWG1,No. Nanjing, China; May 23, 2016-May 27, 2016, May 14, 2016, XP051096392, 4 pages.
(Continued)

*Primary Examiner* — Warner Wong
(74) *Attorney, Agent, or Firm* — Womble Bond Dickinson (US) LLP

(57) ABSTRACT

An information processing method and a terminal device are disclosed. The method is applied to a terminal device and includes: grouping DL component carriers CCs based on a downlink DL transmission length; and sending UCI based on grouped DL CCs by using an uplink UL CC, where the UCI is UCI corresponding to the grouped DL CCs, and transmission lengths of DL CCs in at least one DL CC group of the grouped DL CCs are all the same. According to embodiments of the present invention, an information transmission delay can be reduced.

20 Claims, 6 Drawing Sheets

(51) Int. Cl.
    *H04W 28/02* (2009.01)
    *H04L 1/00* (2006.01)
    *H04W 72/02* (2009.01)
    *H04W 72/10* (2009.01)

(52) U.S. Cl.
    CPC ....... *H04W 72/02* (2013.01); *H04W 72/0413* (2013.01); *H04W 72/0446* (2013.01); *H04W 72/10* (2013.01); *H04W 72/1268* (2013.01); *H04W 72/1289* (2013.01)

(58) Field of Classification Search
    CPC ......... H04W 72/1205; H04W 72/1263; H04W 72/1268; H04W 72/1278; H04W 72/1289; H04L 2012/5675; H04L 5/001; H04L 5/0098
    See application file for complete search history.

(56) References Cited

U.S. PATENT DOCUMENTS

| | | | | |
|---|---|---|---|---|
| 2012/0140743 | A1 | 6/2012 | Pelletier et al. | |
| 2012/0294272 | A1* | 11/2012 | Han | H04L 1/0027 370/329 |
| 2012/0300741 | A1* | 11/2012 | Han | H04L 1/1854 370/329 |
| 2012/0320813 | A1* | 12/2012 | Han | H04L 1/1861 370/311 |
| 2013/0039334 | A1* | 2/2013 | Han | H04L 5/0007 370/330 |
| 2013/0058315 | A1 | 3/2013 | Feuersänger et al. | |
| 2013/0077593 | A1* | 3/2013 | Han | H04L 1/0079 370/329 |
| 2013/0100919 | A1* | 4/2013 | Han | H04W 72/0413 370/329 |
| 2013/0107854 | A1* | 5/2013 | Han | H04L 5/0053 370/330 |
| 2013/0114461 | A1* | 5/2013 | Seo | H04L 1/1861 370/252 |
| 2013/0136071 | A1* | 5/2013 | Han | H04L 5/0019 370/329 |
| 2013/0136093 | A1* | 5/2013 | Han | H04B 7/0689 370/329 |
| 2013/0142161 | A1* | 6/2013 | Lee | H04L 5/001 370/329 |
| 2013/0148613 | A1* | 6/2013 | Han | H04L 1/0026 370/329 |
| 2013/0163553 | A1* | 6/2013 | Lee | H04L 1/0027 370/329 |
| 2013/0182627 | A1* | 7/2013 | Lee | H04L 5/0053 370/311 |
| 2013/0188589 | A1* | 7/2013 | Nakashima | H04B 7/0404 370/329 |
| 2013/0223296 | A1* | 8/2013 | Zeng | H04L 5/0007 370/280 |
| 2013/0223396 | A1* | 8/2013 | Han | H04L 1/1671 370/329 |
| 2013/0272258 | A1* | 10/2013 | Lee | H04B 7/0413 370/329 |
| 2013/0286993 | A1* | 10/2013 | Lee | H04L 5/0078 370/329 |
| 2013/0343322 | A1* | 12/2013 | Lee | H04B 7/2656 370/329 |
| 2014/0003381 | A1* | 1/2014 | Lee | H04L 1/0026 370/329 |
| 2014/0071931 | A1* | 3/2014 | Lee | H04L 5/001 370/329 |
| 2014/0092832 | A1* | 4/2014 | Han | H04L 1/1861 370/329 |
| 2014/0112280 | A1* | 4/2014 | Lee | H04L 5/0094 370/329 |
| 2015/0189675 | A1 | 7/2015 | Feuersaenger et al. | |
| 2016/0095137 | A1 | 3/2016 | Chen et al. | |
| 2016/0119840 | A1 | 4/2016 | Loehr et al. | |
| 2016/0182202 | A1 | 6/2016 | Patel et al. | |
| 2016/0205664 | A1 | 7/2016 | Zhang et al. | |
| 2017/0063506 | A1* | 3/2017 | Astely | H04L 5/0094 |
| 2017/0318582 | A1 | 11/2017 | Au et al. | |
| 2018/0295608 | A1* | 10/2018 | Nguyen | H04W 72/044 |

FOREIGN PATENT DOCUMENTS

| | | | |
|---|---|---|---|
| CN | 102918896 A | 2/2013 | |
| CN | 103238368 A | 8/2013 | |
| CN | 104620629 A | 5/2015 | |
| EP | 1906572 A1 | 4/2008 | |
| WO | WO-2011135916 A1 * | 11/2011 | ............ H04L 5/006 |
| WO | 2016/039572 A2 | 3/2016 | |
| WO | 2016053844 A1 | 4/2016 | |

OTHER PUBLICATIONS

Huawei et al: "On CA enhancements supporting up to 32 component carriers", 3GPP DRAFT; R1-153198, vol. RAN WG1,No. Fukuoka, Japan; May 25, 2015-May 29, 2015, May 16, 2015, XP050970383, 8 pages.

* cited by examiner

INFORMATION PROCESSING METHOD AND DEVICE

CROSS-REFERENCE TO RELATED APPLICATIONS

This application is a continuation of International Application No. PCT/CN2016/094724, filed on Aug. 11, 2016, the disclosure of which is hereby incorporated by reference in its entirety.

TECHNICAL FIELD

The present invention relates to the field of communications technologies, and specifically, to an information processing method and a device.

BACKGROUND

Long Term Evolution-Advanced (LTE-A) is further evolution of Long Term Evolution (LTE). To meet a high-bandwidth requirement of LTE-A, a carrier aggregation (CA) technology is used in an LTE-A system to extend system bandwidth. In carrier aggregation, at least two component carriers (CCs) are aggregated to support higher transmission bandwidth. Currently, a transmission time interval (TTI) used to transmit uplink data and downlink data is 1 ms. To improve data transmission efficiency, a low latency technology is proposed in the industry. That is, a TTI of uplink data and downlink data is not fixed at 1 ms, but may be a TTI less than 1 ms, namely, a short TTI (sTTI). When TTIs configured for CCs are different, if the CCs need to be aggregated to transmit uplink control information (UCI), because the CCs include a CC having an sTTI, an information transmission delay increases if the UCI is transmitted by using a TTI of 1 ms.

SUMMARY

Embodiments of the present invention disclose an information processing method and a device, to reduce an information transmission delay.

According to a first aspect, an information processing method is disclosed, where the method is applied to a terminal device. DL CCs are grouped based on a downlink (DL) transmission length, and then UCI is sent based on grouped DL CCs by using an uplink (UL) CC, but not sent by using a UL CC having a fixed length of 1 ms. This can reduce an information transmission delay. Transmission lengths of DL CCs in at least one DL CC group of the grouped DL CCs are all the same.

In an embodiment, a CC may be scheduled based on the grouped DL CCs. This can resolve a scheduling problem between CCs having different transmission lengths, so as to reduce complexity of cross-carrier scheduling.

In an embodiment, DL CCs having different DL transmission lengths may be grouped into different DL CC groups. When time division multiplexing (TDM) is used for UL CCs having different transmission lengths, and the UCI is sent based on the grouped DL CCs by using the UL CC, UCI corresponding to the different DL CC groups may be separately sent by using different transmission opportunities in a first UL CC, where the first UL CC is a UL CC having a smallest transmission length in UL CCs whose capacity is greater than or equal to a first capacity, and the first capacity is a capacity of UCI corresponding to each of the different DL CC groups. Therefore, when a capacity is sufficient, all information is transmitted with a smallest transmission delay, so as to reduce an information transmission delay.

In an embodiment, when DL CCs having different DL transmission lengths are grouped into different DL CC groups, TDM is used for UL CCs having different transmission lengths, and the UCI is sent based on the grouped DL CCs by using the UL CC, information whose priority is lower than a first preset value in UCI corresponding to each of the different DL CC groups or M pieces of information with one or more lowest priorities in the UCI corresponding to each of the different DL CC groups may be further discarded; and remaining UCI corresponding to the different DL CC groups is separately sent by using different transmission opportunities in a second UL CC, where the second UL CC is a UL CC having a smallest transmission length in UL CCs whose capacity is greater than or equal to a second capacity, and the second capacity is a capacity of the remaining UCI corresponding to each of the different DL CC groups. Therefore, when a capacity is insufficient, it is ensured that high-priority information is transmitted with a smallest transmission delay, so as to reduce an information transmission delay. M is an integer greater than or equal to 1.

In an embodiment, DL CCs having different DL transmission lengths may be grouped into different DL CC groups. When frequency division multiplexing (FDM) is used for UL CCs having different transmission lengths, the UCI is sent based on the grouped DL CCs by using the UL CC, and a capacity of a third UL CC whose transmission length is the same as a transmission length of a first DL CC group is greater than or equal to a capacity of UCI corresponding to the first DL CC group, the UCI corresponding to the first DL CC group is sent by using the third UL CC. Therefore, when a capacity is sufficient, it is ensured that information having different transmission lengths each is transmitted by using a UL CC that has a same transmission length as the first DL CC group. The first DL CC group is any one of the different DL CC groups.

In an embodiment, when DL CCs having different DL transmission lengths are grouped into different DL CC groups, FDM is used for UL CCs having different transmission lengths, and a capacity of a third UL CC whose transmission length is the same as a transmission length of a first DL CC group is less than a capacity of UCI corresponding to the first DL CC group, information whose priority is lower than a second preset value in the UCI corresponding to the first DL CC group or N pieces of information with one or more lowest priorities in the UCI corresponding to the first DL CC group are discarded; and remaining UCI corresponding to the first DL CC group is sent by using the third UL CC. Therefore, when a capacity is insufficient, it is ensured that high-priority information having different transmission lengths each is transmitted by using a UL CC that has a same transmission length as the first DL CC group. N is an integer greater than or equal to 1.

In an embodiment, when DL CCs having different DL transmission lengths are grouped into different DL CC groups, FDM is used for UL CCs having different transmission lengths, and a capacity of a third UL CC whose transmission length is the same as a transmission length of a first DL CC group is less than a capacity of UCI corresponding to the first DL CC group, a part of information whose capacity is the same as that of the third UL CC may be selected from the UCI corresponding to the first DL CC group, the part of information is sent by using the third UL CC, and a remaining part of information in the UCI corresponding to the first DL CC group is sent by using a target UL CC, where the target UL CC is a UL CC whose transmission length is different from the DL transmission length. Therefore, when a capacity is insufficient, it is ensured that a part of information having different transmission lengths each is transmitted by using a UL CC that has a same transmission length as the first DL CC group, and a remaining part of information each is transmitted by using a UL CC whose transmission length is different from that of the first DL CC group, so that all information can be transmitted.

In an embodiment, DL CCs having different DL transmission lengths may be grouped into different DL CC groups. When the UCI is sent based on the grouped DL CCs by using the UL CC, UCI corresponding to the different DL CC groups may be sent by using one transmission opportunity in a fourth UL CC, where the fourth UL CC is a UL CC having a smallest transmission length in UL CCs whose capacity is greater than or equal to a third capacity, and the third capacity is a total capacity of the UCI corresponding to the different DL CC groups. Therefore, when a capacity is sufficient, it is ensured that all information is simultaneously transmitted by using a same transmission length, so as to reduce an information transmission delay.

In an embodiment, when the UCI is sent based on the grouped DL CCs by using the UL CC, information in UCI corresponding to each of the different DL CC groups may be sorted in descending order of priorities; K pieces of information in the UCI corresponding to each of the different DL CC groups are discarded, where the K pieces of information are of one or more lowest priorities or their priorities are lower than a third preset value; and remaining UCI corresponding to the different DL CC groups is sent by using one transmission opportunity in a fifth UL CC, where the fifth UL CC is a UL CC having a smallest transmission length in UL CCs whose capacity is greater than or equal to a fourth capacity, and the fourth capacity is a total capacity of the remaining UCI corresponding to the different DL CC groups. Therefore, when a capacity is insufficient, it is ensured that high-priority information in each DL CC group is simultaneously transmitted by using a same transmission length, so as to reduce an information transmission delay. K is an integer greater than or equal to 1.

In an embodiment, when the UCI is sent based on the grouped DL CCs by using the UL CC, alternatively, at least one DL CC group having a lowest priority in the different DL CC groups may be discarded, and UCI corresponding to a remaining DL CC group in the different DL CC groups is sent by using one transmission opportunity in a sixth UL CC, where the sixth UL CC is a UL CC having a smallest transmission length in UL CCs whose capacity is greater than or equal to a fifth capacity, and the fifth capacity is a total capacity of the UCI corresponding to the remaining DL CC group in the different DL CC groups. Therefore, it is ensured that information of a high-priority DL CC group is simultaneously transmitted by using a same transmission length, so as to reduce an information transmission delay.

In an embodiment, a DL CC whose DL transmission length is 1 ms may be determined as a second DL CC group, and a DL CC whose DL transmission length is less than 1 ms may be determined as a third DL CC group. When the UCI is sent based on the grouped DL CCs by using the UL CC, UCI corresponding to the second DL CC group is sent by using a seventh UL CC, and UCI corresponding to the third DL CC group is sent by using an eighth UL CC, where a capacity of the seventh UL CC is greater than or equal to a capacity of the UCI corresponding to the second DL CC group, and a capacity of the eighth UL CC is greater than or equal to a capacity of the UCI corresponding to the third DL CC group. Therefore, it is ensured that all information can be transmitted.

In an embodiment, DL CCs having different DL transmission lengths may be grouped into different DL CC groups, and a CC is scheduled from a DL CC group to which a DL CC corresponding to a target cell belongs, where the target cell is any one of cells allocated to the terminal device. This can ensure that a scheduling CC and the scheduled CC have a same transmission length, and can resolve a scheduling problem between CCs having different transmission lengths. In addition, information about scheduled CCs may be sent to a base station, so that the base station knows which CCs are scheduled by the terminal device. In addition, information about scheduled CCs that is sent by the base station may also be received, so that the terminal device knows which CCs are scheduled by the base station.

In an embodiment, the UCI may include at least one of a scheduling request (SR), a hybrid automatic repeat request (HARQ), and channel state information (CSI).

According to a second aspect, a terminal device is disclosed. The terminal device includes units configured to perform the information processing method provided in the first aspect or any one of the possible implementations of the first aspect.

According to a third aspect, a terminal device is disclosed, including: a processor, a memory, and a transmitter, where the memory is configured to store a group of program code. The processor is configured to invoke the program code stored in the memory to perform the following operation:

grouping DL CCs based on a DL transmission length; and the transmitter is configured to send UCI based on grouped DL CCs by using a UL CC, where the UCI is UCI corresponding to the grouped DL CCs, and transmission lengths of DL CCs in at least one DL CC group of the grouped DL CCs are all the same.

In an embodiment, the processor is further configured to invoke the program code stored in the memory to perform the following operation:

scheduling a CC based on the grouped DL CCs.

In an embodiment, the grouping, by the processor, DL CCs based on a DL transmission length includes:

grouping DL CCs having different DL transmission lengths into different DL CC groups; and when TDM is used for UL CCs having different transmission lengths, sending, by the transmitter, UCI based on grouped DL CCs by using a UL CC includes:

separately sending, by the transmitter by using different transmission opportunities in a first UL CC, UCI corresponding to the different DL CC groups, where the first UL CC is a UL CC having a smallest transmission length in UL CCs whose capacity is greater than or equal to a first capacity, and the first capacity is a largest capacity in capacities of UCI corresponding to each of the different DL CC groups.

In an embodiment, the sending, by the transmitter, UCI based on grouped DL CCs by using a UL CC further includes:

discarding, by the processor, information whose priority is lower than a first preset value in UCI corresponding to each of the different DL CC groups or M pieces of information with one or more lowest priorities in the UCI corresponding to each of the different DL CC groups; and separately sending, by the transmitter by using different transmission opportunities in a second UL CC, remaining UCI corresponding to the different DL CC groups, where the second UL CC is a UL CC having a smallest transmission length in UL CCs whose capacity is greater than or equal to a second capacity, the second capacity is a largest capacity in capacities of the remaining UCI corresponding to each of the different DL CC groups, and M is an integer greater than or equal to 1.

In an embodiment, the grouping, by the processor, DL CCs based on a DL transmission length includes:

grouping DL CCs having different DL transmission lengths into different DL CC groups; and when FDM is used for UL CCs having different transmission lengths, the sending, by the transmitter, UCI based on grouped DL CCs by using a UL CC includes:

when a capacity of a third UL CC is greater than or equal to a capacity of UCI corresponding to a first DL CC group, sending, by the transmitter by using the third UL CC, the UCI corresponding to the first DL CC group, where the first DL CC group is any one of the different DL CC groups, and the third UL CC is a UL CC that has a same transmission length as the first DL CC group.

In an embodiment, the sending, by the transmitter, UCI based on grouped DL CCs by using a UL CC further includes:

when a capacity of a third UL CC is less than a capacity of UCI corresponding to a first DL CC group, discarding, by the processor, information whose priority is lower than a second preset value in the UCI corresponding to the first DL CC group or N pieces of information with one or more lowest priorities in the UCI corresponding to the first DL CC group; and sending, by the transmitter by using the third UL CC, remaining UCI corresponding to the first DL CC group, where N is an integer greater than or equal to 1.

In an embodiment, the grouping, by the processor, DL CCs based on a DL transmission length includes:

grouping DL CCs having different DL transmission lengths into different DL CC groups; and the sending, by the transmitter, UCI based on grouped DL CCs by using a UL CC includes:

sending, by the transmitter by using one transmission opportunity in a fourth UL CC, UCI corresponding to the different DL CC groups, where the fourth UL CC is a UL CC having a smallest transmission length in UL CCs whose capacity is greater than or equal to a third capacity, and the third capacity is a total capacity of the UCI corresponding to the different DL CC groups.

In an embodiment, the sending, by the transmitter, UCI based on grouped DL CCs by using a UL CC further includes:

sorting, by the processor in descending order of priorities, information in UCI corresponding to each of the different DL CC groups, and discarding K pieces of information in the UCI corresponding to each of the different DL CC groups, where the K pieces of information are of one or more lowest priorities or their priorities are lower than a third preset value; and sending, by the transmitter by using one transmission opportunity in a fifth UL CC, remaining UCI corresponding to the different DL CC groups, where the fifth UL CC is a UL CC having a smallest transmission length in UL CCs whose capacity is greater than or equal to a fourth capacity, the fourth capacity is a total capacity of the remaining UCI corresponding to the different DL CC groups, and K is an integer greater than or equal to 1.

In an embodiment, the sending, by the transmitter, UCI based on grouped DL CCs by using a UL CC further includes:

discarding, by the processor, at least one DL CC group having a lowest priority in the different DL CC groups; and sending, by the transmitter by using one transmission opportunity in a sixth UL CC, UCI corresponding to a remaining DL CC group in the different DL CC groups, where the sixth UL CC is a UL CC having a smallest transmission length in UL CCs whose capacity is greater than or equal to a fifth capacity, and the fifth capacity is a total capacity of the UCI corresponding to the remaining DL CC group in the different DL CC groups.

In an embodiment, the grouping, by the processor, DL CCs based on a DL transmission length includes:

determining a DL CC whose DL transmission length is 1 ms as a second DL CC group, and determining a DL CC whose DL transmission length is less than 1 ms as a third DL CC group; and the sending, by the transmitter, UCI based on grouped DL CCs by using a UL CC includes:

sending, by using a seventh UL CC, UCI corresponding to the second DL CC group, and sending, by using an eighth UL CC, UCI corresponding to the third DL CC group, where a capacity of the seventh UL CC is greater than or equal to a capacity of the UCI corresponding to the second DL CC group, and a capacity of the eighth UL CC is greater than or equal to a capacity of the UCI corresponding to the third DL CC group.

In an embodiment, the grouping, by the processor, DL CCs based on a DL transmission length includes:

grouping DL CCs having different DL transmission lengths into different DL CC groups; and the scheduling, by the processor, a CC based on the grouped DL CCs includes:

scheduling a CC from a DL CC group to which a DL CC corresponding to a target cell belongs, where the target cell is any one of cells allocated to the terminal device.

The transmitter is further configured to send information about the scheduled CC to a base station.

The terminal device further includes a receiver, where the receiver is configured to receive information about a scheduled CC that is sent by the base station.

In an embodiment, the UCI may include at least one of an SR, a HARQ, and CSI.

According to a fourth aspect, a readable storage medium is disclosed. The readable storage medium stores program code used by a terminal device to perform the information processing method disclosed in the first aspect or any one of the possible implementations of the first aspect.

According to a fifth aspect, an information processing method is disclosed, where the method is applied to a base station. DL CCs are grouped based on a DL transmission length, and UCI sent by a terminal device by using a UL CC is received, where the UCI is UCI corresponding to grouped DL CCs, and transmission lengths of DL CCs in at least one DL CC group of the grouped DL CCs are all the same. It can be learned that the terminal device does not send the UCI by using a UL CC having a fixed length of 1 ms. Therefore, the base station can quickly receive the UCI sent by the terminal device, so as to reduce an information transmission delay.

In an embodiment, the base station may schedule a CC based on the grouped DL CCs. This can resolve a scheduling problem between CCs having different transmission lengths, so as to reduce complexity of cross-carrier scheduling.

In an embodiment, DL CCs having different DL transmission lengths may be grouped into different DL CC groups. When TDM is used for UL CCs having different transmission lengths, UCI that corresponds to the different DL CC groups and that is separately sent by the terminal device by using different transmission opportunities in a first UL CC may be received, where the first UL CC is a UL CC having a smallest transmission length in UL CCs whose capacity is greater than or equal to a first capacity, and the first capacity is a largest capacity in capacities of UCI corresponding to each of the different DL CC groups. Therefore, when a capacity is sufficient, the terminal device sends all information to the base station with a smallest transmission delay, so as to reduce an information transmission delay.

In an embodiment, alternatively, a part of UCI that corresponds to the different DL CC groups and that is separately sent by the terminal device by using different transmission opportunities in a second UL CC may be received, where the second UL CC is a UL CC having a smallest transmission length in UL CCs whose capacity is greater than or equal to a second capacity, the second capacity is a largest capacity in capacities of the part of UCI corresponding to each of the different DL CC groups, and the part of UCI corresponding to the different DL CC groups is obtained after the terminal device discards information whose priority is lower than a first preset value in UCI corresponding to each of the different DL CC groups or M pieces of information with one or more lowest priorities in UCI corresponding to each of the different DL CC groups. Therefore, when a capacity is insufficient, it is ensured that the terminal device transmits high-priority information to the base station with a smallest transmission delay, so as to reduce an information transmission delay. M is an integer greater than or equal to 1.

In an embodiment, when DL CCs having different DL transmission lengths are grouped into different DL CC groups, and FDM is used for UL CCs having different transmission lengths, UCI that corresponds to a first DL CC group and that is sent by the terminal device by using a third UL CC may be received, where a capacity of the third UL CC is greater than or equal to a capacity of the UCI corresponding to the first DL CC group, the first DL CC group is any one of the different DL CC groups, and a transmission length of the third UL CC is the same as a transmission length of the first DL CC group. Therefore, when a capacity is sufficient, it is ensured that the terminal device separately transmits, to the base station, information having different transmission lengths by using a UL CC that has a same transmission length as the first DL CC group.

In an embodiment, when DL CCs having different DL transmission lengths are grouped into different DL CC groups, and FDM is used for UL CCs having different transmission lengths, alternatively, a part of UCI that corresponds to the first DL CC group and that is sent by the terminal device by using the third UL CC may be received. In this case, the capacity of the third UL CC is less than the capacity of the UCI corresponding to the first DL CC group, and the part of UCI is obtained after the terminal device discards information whose priority is lower than a second preset value in the UCI corresponding to the first DL CC group or N pieces of information with one or more lowest priorities in the UCI corresponding to the first DL CC group. Therefore, when a capacity is insufficient, it is ensured that the terminal device separately transmits, to the base station, high-priority information having different transmission lengths by using a UL CC that has a same transmission length as the first DL CC group. N is an integer greater than or equal to 1.

In an embodiment, when DL CCs having different DL transmission lengths are grouped into different DL CC groups, UCI that corresponds to the different DL CC groups and that is sent by the terminal device by using one transmission opportunity in a fourth UL CC may be received, where the fourth UL CC is a UL CC having a smallest transmission length in UL CCs whose capacity is greater than or equal to a third capacity, and the third capacity is a total capacity of the UCI corresponding to the different DL CC groups. Therefore, when a capacity is sufficient, it is ensured that the terminal device simultaneously transmits all information to the base station by using a same transmission length, so as to reduce an information transmission delay.

In an embodiment, when DL CCs having different DL transmission lengths are grouped into different DL CC groups, a part of UCI that corresponds to the different DL CC groups and that is sent by the terminal device by using one transmission opportunity in a fifth UL CC may be further received, where the part of UCI corresponding to the different DL CC groups is obtained after the terminal device sorts, in descending order of priorities, information in UCI corresponding to each of the different DL CC groups, and discards K pieces of information in the UCI corresponding to each of the different DL CC groups, where the K pieces of information are of one or more lowest priorities or their priorities are lower than a third preset value, the fifth UL CC is a UL CC having a smallest transmission length in UL CCs whose capacity is greater than or equal to a fourth capacity, and the fourth capacity is a total capacity of the part of UCI corresponding to the different DL CC groups. Therefore, when a capacity is insufficient, it is ensured that the terminal device simultaneously transmits high-priority information in each DL CC group to the base station by using a same transmission length, so as to reduce an information transmission delay. K is an integer greater than or equal to 1.

In an embodiment, when DL CCs having different DL transmission lengths are grouped into different DL CC groups, UCI that corresponds to some DL CC groups in the different DL CC groups and that is sent by the terminal device by using one transmission opportunity in a sixth UL CC may be further received, where the some DL CC groups are obtained after the terminal device discards at least one DL CC group having a lowest priority in the different DL CC groups, the sixth UL CC is a UL CC having a smallest transmission length in UL CCs whose capacity is greater than or equal to a fifth capacity, and the fifth capacity is a total capacity of the UCI corresponding to the some DL CC groups. Therefore, it is ensured that the terminal device simultaneously transmits information of a high-priority DL CC group to the base station by using a same transmission length, so as to reduce an information transmission delay.

In an embodiment, a DL CC whose DL transmission length is 1 ms may be determined as a second DL CC group, and a DL CC whose DL transmission length is less than 1 ms may be determined as a third DL CC group. In this case, UCI that corresponds to the second DL CC group and that is sent by the terminal device by using a seventh UL CC may be received, and UCI that corresponds to the third DL CC group and that is sent by the terminal device by using an eighth UL CC may be received, where a capacity of the seventh UL CC is greater than or equal to a capacity of the UCI corresponding to the second DL CC group, a capacity of the eighth UL CC is greater than or equal to a capacity of the UCI corresponding to the third DL CC group. Therefore, it is ensured that all information can be transmitted.

In an embodiment, DL CCs having different DL transmission lengths may be grouped into different DL CC groups, and a CC may be scheduled from a DL CC group to which a DL CC corresponding to a target cell belongs. The target cell is any one of cells allocated to the terminal device. This can ensure that a scheduling CC and the scheduled CC have a same transmission length, and can resolve a scheduling problem between CCs having different transmission lengths. In addition, the base station may also send information about scheduled CCs to the terminal device, so that the terminal device knows which CCs are scheduled by the base station. In addition, the base station may further receive information about scheduled CCs that is sent by the terminal device, so that the base station knows which CCs are scheduled by the terminal device.

In an embodiment, the UCI may include at least one of an SR, a HARQ, and CSI.

According to a sixth aspect, a base station is disclosed. The base station includes units configured to perform the information processing method provided in the second aspect or any one of the possible implementations of the second aspect.

According to a seventh aspect, a base station is disclosed, including: a processor, a memory, and a receiver, where the memory is configured to store a group of program code; the processor is configured to invoke the program code stored in the memory to perform the following operation:

grouping DL CCs based on a DL transmission length; and the receiver is configured to receive UCI sent by a terminal device.

The UCI is UCI corresponding to grouped DL CCs, and transmission lengths of DL CCs in at least one DL CC group of the grouped DL CCs are all the same.

In an embodiment, the processor is further configured to invoke the program code stored in the memory to perform the following operation:

scheduling a CC based on the grouped DL CCs.

In an embodiment, the grouping, by the processor, DL CCs based on a DL transmission length includes:

grouping DL CCs having different DL transmission lengths into different DL CC groups; and when TDM is used for UL CCs having different transmission lengths, the receiving, by the receiver, UCI sent by a terminal device includes:

receiving UCI that corresponds to the different DL CC groups and that is separately sent by the terminal device by using different transmission opportunities in a first UL CC, where the first UL CC is a UL CC having a smallest transmission length in UL CCs whose capacity is greater than or equal to a first capacity, and the first capacity is a capacity of UCI corresponding to each of the different DL CC groups.

In an embodiment, the receiving, by the receiver, UCI sent by a terminal device further includes:

receiving a part of UCI that corresponds to the different DL CC groups and that is separately sent by the terminal device by using different transmission opportunities in a second UL CC, where the second UL CC is a UL CC having a smallest transmission length in UL CCs whose capacity is greater than or equal to a second capacity, the second capacity is a capacity of the part of UCI corresponding to each of the different DL CC groups, and the part of UCI corresponding to the different DL CC groups is obtained after the terminal device discards information whose priority is lower than a first preset value in UCI corresponding to each of the different DL CC groups or M pieces of information with one or more lowest priorities in UCI corresponding to each of the different DL CC groups; and M is an integer greater than or equal to 1.

In an embodiment, the grouping, by the processor, DL CCs based on a DL transmission length includes:

grouping DL CCs having different DL transmission lengths into different DL CC groups; and when frequency division multiplexing FDM is used for UL CCs having different transmission lengths, the receiving, by the receiver, UCI sent by a terminal device includes:

receiving UCI that corresponds to a first DL CC group and that is sent by the terminal device by using a third UL CC, where a capacity of the third UL CC is greater than or equal to a capacity of UCI corresponding to the first DL CC group, the first DL CC group is any one of the different DL CC groups, and a transmission length of the third UL CC is the same as a transmission length of the first DL CC group.

In an embodiment, the receiving, by the receiver, UCI sent by a terminal device further includes:

receiving a part of UCI that corresponds to the first DL CC group and that is sent by the terminal device by using the third UL CC, where the capacity of the third UL CC is less than the capacity of the UCI corresponding to the first DL CC group, the part of UCI is obtained after the terminal device discards information whose priority is lower than a second preset value in the UCI corresponding to the first DL CC group or N pieces of information with one or more lowest priorities in the UCI corresponding to the first DL CC group, and N is an integer greater than or equal to 1.

In an embodiment, the grouping, by the processor, DL CCs based on a DL transmission length includes:

grouping DL CCs having different DL transmission lengths into different DL CC groups; and the receiving, by the receiver, UCI sent by a terminal device includes:

receiving UCI that corresponds to the different DL CC groups and that is sent by the terminal device by using one transmission opportunity in a fourth UL CC, where the fourth UL CC is a UL CC having a smallest transmission length in UL CCs whose capacity is greater than or equal to a third capacity, and the third capacity is a total capacity of the UCI corresponding to the different DL CC groups.

In an embodiment, the receiving, by the receiver, UCI sent by a terminal device further includes:

receiving a part of UCI that corresponds to the different DL CC groups and that is sent by the terminal device by using one transmission opportunity in a fifth UL CC, where the part of UCI corresponding to the different DL CC groups is obtained after the terminal device sorts, in descending order of priorities, information in UCI corresponding to each of the different DL CC groups, and discards K pieces of information in the UCI corresponding to each of the different DL CC groups, where the K pieces of information are of one or more lowest priorities or their priorities are lower than a third preset value, the fifth UL CC is a UL CC having a smallest transmission length in UL CCs whose capacity is greater than or equal to a fourth capacity, the fourth capacity is a total capacity of the part of UCI corresponding to the different DL CC groups, and K is an integer greater than or equal to 1.

In an embodiment, the receiving, by the receiver, UCI sent by a terminal device further includes:

receiving UCI that corresponds to some DL CC groups in the different DL CC groups and that is sent by the terminal device by using one transmission opportunity in a sixth UL CC, where the some DL CC groups are obtained after the terminal device discards at least one DL CC group having a lowest priority in the different DL CC groups, the sixth UL CC is a UL CC having a smallest transmission length in UL CCs whose capacity is greater than or equal to a fifth capacity, and the fifth capacity is a total capacity of the UCI corresponding to the some DL CC groups.

In an embodiment, the grouping, by the processor, DL CCs based on a DL transmission length includes:

determining a DL CC whose DL transmission length is 1 ms as a second DL CC group, and determining a DL CC whose DL transmission length is less than 1 ms as a third DL CC group; and the receiving, by the receiver, UCI sent by a terminal device includes:

receiving UCI that corresponds to the second DL CC group and that is sent by the terminal device by using a seventh UL CC, and receiving UCI that corresponds to the third DL CC group and that is sent by the terminal device by using an eighth UL CC, where a capacity of the seventh UL CC is greater than or equal to a capacity of the UCI corresponding to the second DL CC group, and a capacity of the eighth UL CC is greater than or equal to a capacity of the UCI corresponding to the third DL CC group.

In an embodiment, the grouping, by the processor, DL CCs based on a DL transmission length includes:

grouping DL CCs having different DL transmission lengths into different DL CC groups; and scheduling, by the processor, a CC based on the grouped DL CCs includes:

scheduling a CC from a DL CC group to which a DL CC corresponding to a target cell belongs, where the target cell is any one of cells allocated to the terminal device.

The base station may further include a transmitter, where the transmitter is further configured to send information about a scheduled CC to the terminal device; and the receiver is further configured to receive information about a scheduled CC that is sent by the terminal device.

In an embodiment, the UCI may include at least one of an SR, a HARQ, and CSI.

An eighth aspect discloses a readable storage medium. The readable storage medium stores program code used by a base station to perform the information processing method disclosed in any one of the second aspect or the possible implementations of the second aspect.

BRIEF DESCRIPTION OF DRAWINGS

To describe technical solutions in embodiments of the present invention more clearly, the following briefly describes accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention disclose an information processing method and a device, to reduce an information transmission delay. The following separately provides detailed descriptions.

Figure 1:
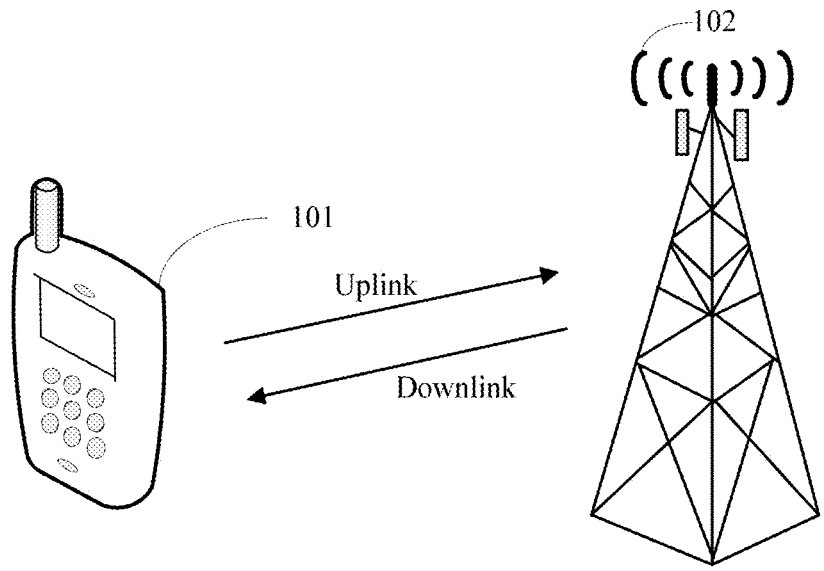
FIG. 1 is a schematic diagram of a network architecture according to an embodiment of the present invention.
Figure 2:
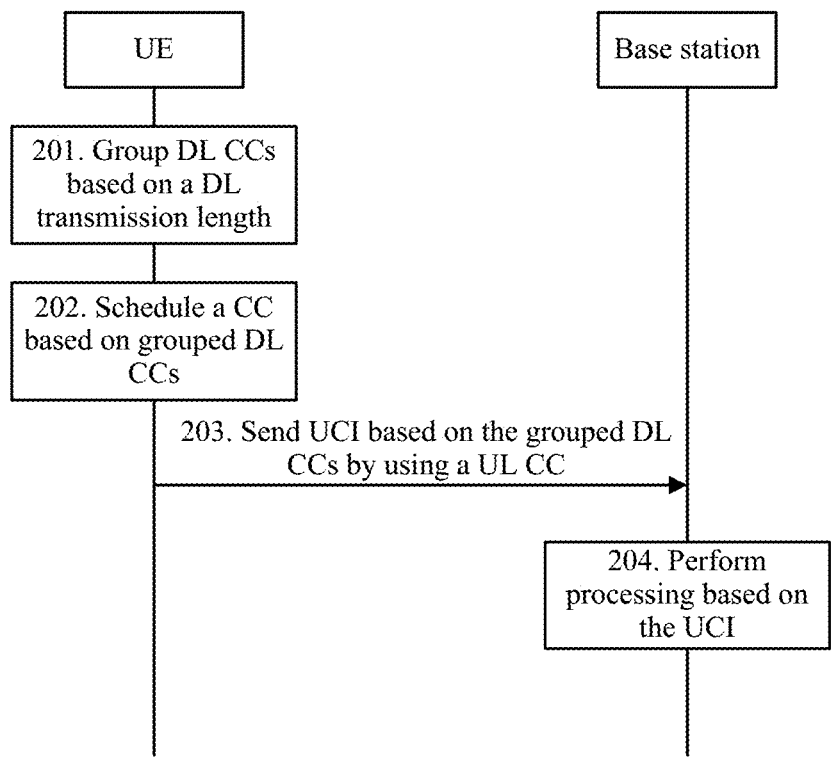
FIG. 2 is a schematic flowchart of an information processing method according to an embodiment of the present invention.

To better understand the information processing method and the device disclosed in the embodiments of the present invention, the following first describes a network architecture applied to the embodiments of the present invention. FIG. 1 is a schematic diagram of a network architecture according to an embodiment of the present invention. As shown in FIG. 1, the network architecture may include a terminal device 101 and a base station 102. The terminal device 101 may communicate with the base station 102. An information flow direction from the base station 102 to the terminal device 101 is a downlink direction, and an information flow direction from the terminal device 101 to the base station 102 is an uplink direction. FIG. 2 is a schematic diagram of another network architecture according to an embodiment of the present invention.

Based on the network architecture shown in FIG. 1, FIG. 2 is a schematic flowchart of an information processing method according to an embodiment of the present invention. The information processing method is described from perspectives of the terminal device 101 and the base station 102. As shown in FIG. 2, the information processing method may include the following operations.

Operation 201. The terminal device groups DL CCs based on a DL transmission length.

In this embodiment, before performing cross-carrier scheduling or transmitting UCI to a peer end, the terminal device may first group the DL CCs based on the DL transmission length. The DL transmission length includes a length of two symbols, seven symbols, or 1 ms. A UL transmission length includes a length of two symbols, four symbols, seven symbols, or 1 ms. Both uplink information and downlink information are transmitted in a form of a system frame structure. A length of each system frame is 10 ms. One system frame includes 10 subframes. A length of each subframe is 1 ms. Each subframe includes two consecutive slots. A length of one slot is seven symbols.

In this embodiment, that the terminal device groups the DL CCs based on the DL transmission length may be: grouping DL CCs having different DL transmission lengths into different DL CC groups, that is, grouping the DL CCs into a two-symbol DL CC group, a seven-symbol DL CC group, and a 1-ms DL CC group; or may be: determining a DL CC whose DL transmission length is 1 ms as a second DL CC group, and determining a DL CC whose DL transmission length is less than 1 ms as a third DL CC group, that is, grouping the DL CCs into a below-1-ms DL CC group and a 1-ms DL CC group, where the below-1-ms DL CC group includes a two-symbol DL CC and a seven-symbol DL CC.

Operation 202. The terminal device schedules a CC based on grouped DL CCs.

In this embodiment, after grouping the DL CCs into three DL CC groups: the two-symbol DL CC group, the seven-symbol DL CC group, and the 1-ms DL CC group, the terminal device may schedule the CC based on the grouped DL CCs, that is, schedule the CC from a DL CC group to which a DL CC corresponding to a target cell belongs, where the target cell is any one of cells allocated to the terminal device, so as to ensure that a scheduling CC and the scheduled CC have a same transmission length.

In an implementation, when all CCs have a same transmission length, and the transmission length is less than 1 ms, for example, seven symbols, four symbols, or two symbols, and when a large data packet needs to be transmitted, and a capacity of each CC is less than a capacity of the data packet, to transmit the large data packet, a plurality of CCs need to be simultaneously scheduled to expand a transmission capacity. In this case, the base station 102 may indicate, to the terminal device by using higher layer signaling or physical layer signaling, a quantity of CCs used for carrier aggregation, that is, indicate a quantity of scheduled CCs. For example, downlink control information (DCI) or radio resource control (RRC) signaling is used for indication.

In an embodiment, when cross-carrier scheduling is performed between carriers having different transmission lengths, the transmission lengths cannot be aligned. In addition, when cross-carrier scheduling is performed, there is a many-to-one scheduling problem. For example, when a CC whose transmission length is two symbols is scheduled by using a CC whose transmission length is seven symbols, seven CCs whose transmission length is two symbols need to be scheduled by using two CCs whose transmission length is seven symbols. In this case, the base station 102 may indicate an index of a scheduled CC by using higher layer signaling or physical layer signaling, to indicate which CCs may be scheduled. For example, DCI or RRC signaling is used for indication. In an example, when seven CCs whose transmission length is two symbols need to be scheduled by using two CCs whose transmission length is seven symbols, the base station 102 may add, to the DCI, indexes of the seven CCs whose transmission length is two symbols.

In an embodiment, the terminal device may send information about scheduled CCs to the base station, so that the base station knows which CCs are scheduled by the terminal device, and may receive, by using the scheduled CCs, information sent by the terminal device.

In an embodiment, the terminal device may alternatively receive information about scheduled CCs that is sent by the base station, so that the terminal device knows which CCs are scheduled by the base station, and may receive, by using the scheduled CCs, information sent by the base station.

Operation 203. The terminal device sends UCI to the base station based on the grouped DL CCs by using a UL CC.

In this embodiment, after the terminal device groups the DL CCs based on the DL transmission length, UCI corresponding to different DL CC groups may be transmitted by using one transmission opportunity in a same UL CC, or may be separately transmitted by using different transmission opportunities in a same UL CC, or may be separately transmitted by using different UL CCs. The UCI may include at least one of an SR, a HARQ, and CSI. The SR is used to request a UL shared channel (SCH) resource. The HARQ includes a HARQ acknowledgement (ACK) and a HARQ negative acknowledgement (NACK), used to perform HARQ acknowledgement or negative acknowledgement on downlink data that is sent on a physical downlink control channel (PDSCH). The CSI may include information such as channel quality information (CQI), a precoding matrix indication (PMI), and a rank indication (RI), used to notify a peer end of downlink channel quality and the like, so as to help the peer end perform downlink scheduling.

In this embodiment, after the terminal device groups the DL CCs into the three DL CC groups: the two-symbol DL CC group, the seven-symbol DL CC group, and the 1-ms DL CC group, when TDM is used for UL CCs having different transmission lengths, the terminal device may separately send, by using different transmission opportunities in a first UL CC, UCI corresponding to each of the three DL CC groups, where the first UL CC is a UL CC having a smallest transmission length in UL CCs whose capacity is greater than or equal to a first capacity, and the first capacity is a capacity of the UCI corresponding to each of the three DL CC groups; or may discard information whose priority is lower than a first preset value in UCI corresponding to each of the different DL CC groups or M pieces of information with one or more lowest priorities in the UCI corresponding to each of the three DL CC groups, and separately send, by using different transmission opportunities in a second UL CC, remaining UCI corresponding to each of the three DL CC groups, where the second UL CC is a UL CC having a smallest transmission length in UL CCs whose capacity is greater than or equal to a second capacity, the second capacity is a capacity of the remaining UCI corresponding to each of the three DL CC groups, and M is an integer greater than or equal to 1.

To be specific, after the terminal device groups the DL CCs into the three DL CC groups: the two-symbol DL CC group, the seven-symbol DL CC group, and the 1-ms DL CC group, when TDM is used for the UL CCs having different transmission lengths, the terminal device may first determine whether the UL CCs include UL CCs whose capacities each are greater than or equal to the capacity of the UCI corresponding to each of the three DL CC groups. When the UL CCs include UL CCs whose capacities each are greater than or equal to the capacity of the UCI corresponding to each of the three DL CC groups, the terminal device may select a UL CC having a smallest transmission length from the UL CCs whose capacities each are greater than or equal to the capacity of the UCI corresponding to each of the three DL CC groups, and then separately send, by using different transmission opportunities in the UL CC having the smallest transmission length, the UCI corresponding to each of the three DL CC groups. Alternatively, the terminal device may select a UL CC having a moderate transmission length from the UL CCs whose capacities each are greater than or equal to the capacity of the UCI corresponding to each of the three DL CC groups, and then separately send, by using different transmission opportunities in the UL CC having the moderate transmission length, the UCI corresponding to each of the three DL CC groups. When the UL CCs include no UL CC whose capacities each are greater than or equal to the capacity of the UCI corresponding to each of the three DL CC groups, the terminal device may first determine a priority of the UCI corresponding to each of the three DL CC groups, discard a part of information having a lowest priority in the UCI corresponding to each of the three DL CC groups, so that a capacity of remaining UCI corresponding to each of the three DL CC groups may be less than or equal to a capacity of a UL CC having a largest capacity in the UL CCs, and separately transmit, by using different transmission opportunities in the UL CC having the largest capacity, the remaining UCI corresponding to each of the three DL CC groups, so as to transmit information to the peer end as much as possible; or so that a capacity of remaining UCI corresponding to each of the three DL CC groups may be less than or equal to a capacity of a UL CC having a smallest transmission length in the UL CCs, and separately transmit, by using different transmission opportunities in the UL CC having the smallest transmission length, the remaining UCI corresponding to each of the three DL CC groups, so as to transmit the remaining information with a smallest delay. The UCI is transmitted in a manner of a system frame. When a time sequence or a period of the system frame is represented by using a subframe, each subframe may include a plurality of transmission opportunities. For example, when transmission is performed by using a seven-symbol UL CC, each subframe includes two transmission opportunities; when transmission is performed by using a four-symbol UL CC, each subframe includes three transmission opportunities; or when transmission is performed by using a two-symbol UL CC, each subframe includes seven transmission opportunities. When a time sequence or a period of the system frame is represented by using a time window instead of a subframe, each time window may include a plurality of transmission opportunities. A length of each transmission opportunity is less than 1 ms. Transmission lengths of different transmission opportunities in each time window may be the same or may be different. A length of a time window is pre-agreed, and may be greater than 1 ms, or may be less than 1 ms.

Figure 3:
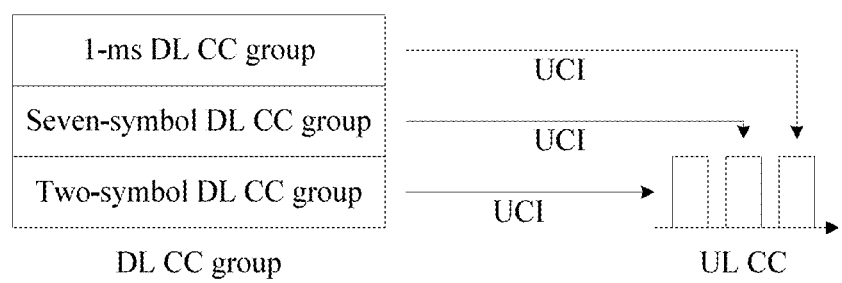
FIG. 3 is a schematic diagram of a UCI transmission manner according to an embodiment of the present invention.

For example, FIG. 3 is a schematic diagram of a UCI transmission manner according to an embodiment of the present invention. As shown in FIG. 3, the DL CCs are grouped into the two-symbol DL CC group, the seven-symbol DL CC group, and the 1-ms DL CC group, and UCI corresponding to each DL CC group is sent by using different transmission opportunities in a UL CC, in other words, is sent at different times.

In an embodiment, when TDM is used for UL CCs, one UL CC may include a plurality of transmission lengths. Transmission lengths of different transmission opportunities may be the same or may be different. In this case, during selection of a UL CC used to send the UCI, a UL CC having a sufficient capacity may be first selected from UL CCs, and then the UCI corresponding to the different DL CC groups may be separately sent by using different transmission opportunities in the UL CC. During selection of a transmission opportunity, the transmission opportunity may be selected according to a criterion of reducing a transmission delay.

In this embodiment, after the terminal device groups the DL CCs into the three DL CC groups: the two-symbol DL CC group, the seven-symbol DL CC group, and the 1-ms DL CC group, when FDM is used for UL CCs having different transmission lengths, and a capacity of a third UL CC is greater than or equal to a capacity of UCI corresponding to a first DL CC group, the terminal device sends, by using the third UL CC, the UCI corresponding to the first DL CC group. The first DL CC group is any one of the three DL CC groups. The third UL CC is a UL CC whose transmission length is the same as a transmission length of the first DL CC group. When the capacity of the third UL CC is less than the capacity of the UCI corresponding to the first DL CC group, information whose priority is lower than a second preset value in the UCI corresponding to the first DL CC group or N pieces of information with one or more lowest priorities in the UCI corresponding to the first DL CC group may be discarded; and remaining UCI corresponding to the first DL CC group is sent by using the third UL CC, where N is an integer greater than or equal to 1. Alternatively, a part of information whose capacity is the same as that of the third UL CC may be selected from the UCI corresponding to the first DL CC group, the part of information is sent by using the third UL CC, and a remaining part of information in the UCI corresponding to the first DL CC group is sent by using a target UL CC. The target UL CC is a UL CC whose transmission length is different from the DL transmission length. Therefore, it is ensured that all information can be sent.

To be specific, after the terminal device groups the DL CCs into the three DL CC groups: the two-symbol DL CC group, the seven-symbol DL CC group, and the 1-ms DL CC group, when FDM is used for the UL CCs having different transmission lengths, and a capacity of a UL CC whose transmission length is the same as a transmission length of each of the three DL CC groups is greater than or equal to a capacity of UCI corresponding to the DL CC group, the terminal device transmits, by using a UL CC whose transmission length is the same as a transmission length of the DL CC group, UCI corresponding to each DL CC group. When a capacity of a UL CC whose transmission length is the same as a transmission length of each of the three DL CC groups is less than a capacity of UCI corresponding to the DL CC group, UCI corresponding to each DL CC group may be first sorted based on a priority, a part of information having a relatively low priority in the UCI corresponding to each DL CC group is discarded, so that a capacity of remaining UCI corresponding to each DL CC group is less than or equal to a capacity of a UL CC whose transmission length is the same as that of the DL CC group, and then the remaining UCI corresponding to each DL CC group is sent by using the UL CC whose transmission length is the same as that of the DL CC group; or a part of information may be selected from UCI corresponding to each DL CC group, a capacity of the part of information is less than or equal to a capacity of a UL CC whose transmission length is the same as a transmission length of the DL CC group, the part of information is sent by using the UL CC whose transmission length is the same as that of the DL CC group, and remaining UCI corresponding to each DL CC group is sent by using a target UL CC, so as to ensure that all information can be transmitted.

Figure 4:
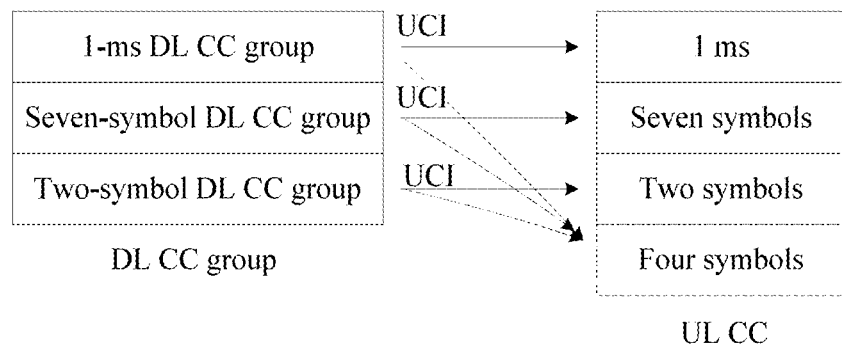
FIG. 4 is a schematic diagram of another UCI transmission manner according to an embodiment of the present invention.

For example, FIG. 4 is a schematic diagram of another UCI transmission manner according to an embodiment of the present invention. As shown in FIG. 4, the DL CCs are grouped into the two-symbol DL CC group, the seven-symbol DL CC group, and the 1-ms DL CC group, and UCI corresponding to each DL CC group may be sent by using a UL CC whose transmission length is the same as a transmission length of the DL CC group, or UCI corresponding to each DL CC group may be sent by using a target UL CC (that is, a four-symbol UL CC) and a UL CC whose transmission length is the same as a transmission length of the DL CC group.

In an embodiment, after the terminal device groups the DL CCs into the three DL CC groups: the two-symbol DL CC group, the seven-symbol DL CC group, and the 1-ms DL CC group, to reduce a transmission delay, the terminal device may send, by using a two-symbol UL CC, UCI corresponding to the two-symbol DL CC group; and when a capacity of a four-symbol UL CC is greater than or equal to a total capacity of UCI corresponding to the seven-symbol DL CC group and/or the 1-ms DL CC group, the terminal device may send, by using the four-symbol UL CC, the UCI corresponding to the seven-symbol DL CC group and/or the 1-ms DL CC group.

In this embodiment, after the terminal device groups the DL CCs into the three DL CC groups: the two-symbol DL CC group, the seven-symbol DL CC group, and the 1-ms DL CC group, the terminal device sends, by using one transmission opportunity in a fourth UL CC, the UCI corresponding to the different DL CC groups. The fourth UL CC is a UL CC having a smallest transmission length in UL CCs whose capacity is greater than or equal to a third capacity. The third capacity is a total capacity of the UCI corresponding to the different DL CC groups, namely, a total UCI capacity. Alternatively, the terminal device may sort, in descending order of priorities, information in the UCI corresponding to each of the different DL CC groups; discard K pieces of information in the UCI corresponding to each of the different DL CC groups, where the K pieces of information are of one or more lowest priorities or their priorities are lower than a third preset value; and send, by using one transmission opportunity in a fifth UL CC, remaining UCI corresponding to the different DL CC groups. The fifth UL CC is a UL CC having a smallest transmission length in UL CCs whose capacity is greater than or equal to a fourth capacity. The fourth capacity is a total capacity of the remaining UCI corresponding to the different DL CC groups. K is an integer greater than or equal to 1. Alternatively, the terminal device may discard at least one DL CC group having a lowest priority in the different DL CC groups; and send, by using one transmission opportunity in a sixth UL CC, UCI corresponding to a remaining DL CC group in the different DL CC groups. The sixth UL CC is a UL CC having a smallest transmission length in UL CCs whose capacity is greater than or equal to a fifth capacity. The fifth capacity is a total capacity of the UCI corresponding to the remaining DL CC group in the different DL CC groups.

In one embodiment, after the terminal device groups the DL CCs into the three DL CC groups: the two-symbol DL CC group, the seven-symbol DL CC group, and the 1-ms DL CC group, the terminal device may first determine whether the UL CCs include UL CCs whose capacity is greater than or equal to a sum of capacities of the UCI corresponding to each of the three DL CC groups; and when the UL CCs include UL CCs whose capacity is greater than or equal to the sum of the capacities of the UCI corresponding to each of the three DL CC groups, the terminal device may select a UL CC having a smallest transmission length from the UL CCs whose capacity is greater than or equal to the sum of the capacities of the UCI corresponding to each of the three DL CC groups, and then send, by using a same transmission opportunity in the UL CC having the smallest transmission length, the UCI corresponding to each of the three DL CC groups; or the terminal device may select a UL CC having a moderate transmission length from the UL CCs whose capacity is greater than or equal to the sum of the capacities of the UCI corresponding to each of the three DL CC groups, and then send, by using a same transmission opportunity in the UL CC having the moderate transmission length, the UCI corresponding to each of the three DL CC groups. When the UL CCs include no UL CC whose capacity is greater than or equal to the sum of the capacities of the UCI corresponding to each of the three DL CC groups, the terminal device may first determine a priority of the UCI corresponding to each of the three DL CC groups, and discard a part of information having a lowest priority in the UCI corresponding to each of the three DL CC groups, so that a sum of capacities of remaining UCI corresponding to each of the three DL CC groups is less than or equal to a capacity of a UL CC having a largest capacity in the UL CCs, and transmit, by using a same transmission opportunity in the UL CC having the largest capacity, the remaining UCI corresponding to each of the three DL CC groups, so as to transmit information to the peer end as much as possible; or so that a sum of capacities of remaining UCI corresponding to each of the three DL CC groups is less than or equal to a capacity of a UL CC having a smallest transmission length in the UL CCs, and transmit, by using a same transmission opportunity in the UL CC having the smallest transmission length, the remaining UCI corresponding to each of the three DL CC groups, so as to transmit the remaining information with a smallest delay. When the UL CCs include no UL CC whose capacity is greater than or equal to the sum of the capacities of the UCI corresponding to each of the three DL CC groups, the terminal device may alternatively first determine a priority of the UCI corresponding to each of the three DL CC groups, then determine a priority of each DL CC group based on the priority of the UCI corresponding to each DL CC group, discard at least one DL CC group having a lowest priority in the three DL CC groups, so that a sum of capacities of UCI corresponding to each of remaining DL CC groups is less than or equal to a capacity of a UL CC having a largest capacity in the UL CCs, and transmit, by using a same transmission opportunity in the UL CC having the largest capacity, the UCI corresponding to each of the remaining DL CC groups, so as to transmit information to the peer end as much as possible; or so that a sum of capacities of UCI corresponding to each of remaining DL CC groups is less than or equal to a capacity of a UL CC having a smallest transmission length in the UL CCs, and transmit, by using a same transmission opportunity in the UL CC having the smallest transmission length, the UCI corresponding to each of the remaining DL CC groups, so as to transmit the remaining information with a smallest delay.

Figure 5:
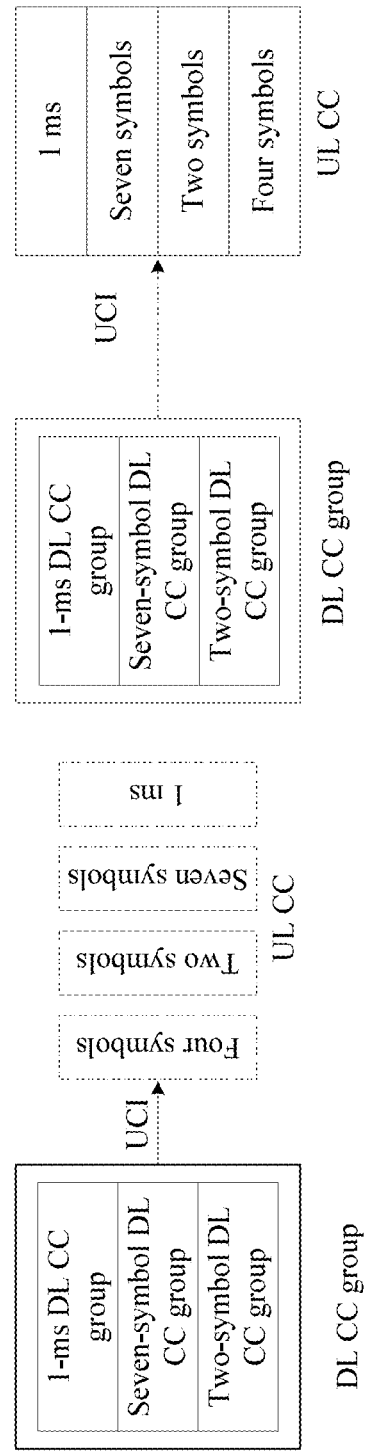
FIG. 5 is a schematic diagram of still another UCI transmission manner according to an embodiment of the present invention.

For example, FIG. 5 is a schematic diagram of still another UCI transmission manner according to an embodiment of the present invention. As shown in FIG. 5, the DL CCs are grouped into the two-symbol DL CC group, the seven-symbol DL CC group, and the 1-ms DL CC group, and UCI corresponding to each DL CC group is sent by using UL CCs having a same transmission length.

In this embodiment, after determining the DL CC whose DL transmission length is 1 ms as the second DL CC group, and determining the DL CC whose DL transmission length is less than 1 ms as the third DL CC group, the terminal device sends, by using a seventh UL CC, UCI corresponding to the second DL CC group, and sends, by using an eighth UL CC, UCI corresponding to the third DL CC group. A capacity of the seventh UL CC is greater than or equal to a capacity of the UCI corresponding to the second DL CC group. A capacity of the eighth UL CC is greater than or equal to a capacity of the UCI corresponding to the third DL CC group.

In one embodiment, after grouping the DL CCs into the below-1-ms DL CC group and the 1-ms DL CC, the terminal device may select, from the UL CCs, a UL CC that has a smallest transmission length and whose capacity is greater than or equal to a capacity of UCI corresponding to the below-1-ms DL CC group, to send the UCI corresponding to the below-1-ms DL CC group; and select, from the UL CCs, a UL CC that has a relatively small transmission length and whose capacity is greater than or equal to a capacity of UCI corresponding to the 1-ms DL CC group, to send the UCI corresponding to the 1-ms DL CC group. When the UL CCs include only one UL CC whose capacity is greater than a capacity of UCI corresponding to one of the two DL CCs, the terminal device may send, by using the UL CC, UCI corresponding to one DL CC group; and may send, by using other two UL CCs, UCI corresponding to the other DL CC group, or may discard a part of information in UCI corresponding to the other DL CC group, so as to send, by using another UL CC, remaining UCI corresponding to the other DL CC group. A principle followed may be: sending all information with a shortest delay, or sending all high-priority information with a shortest delay, or another principle. Details about how allocation should be performed are not described herein.

Figure 6:
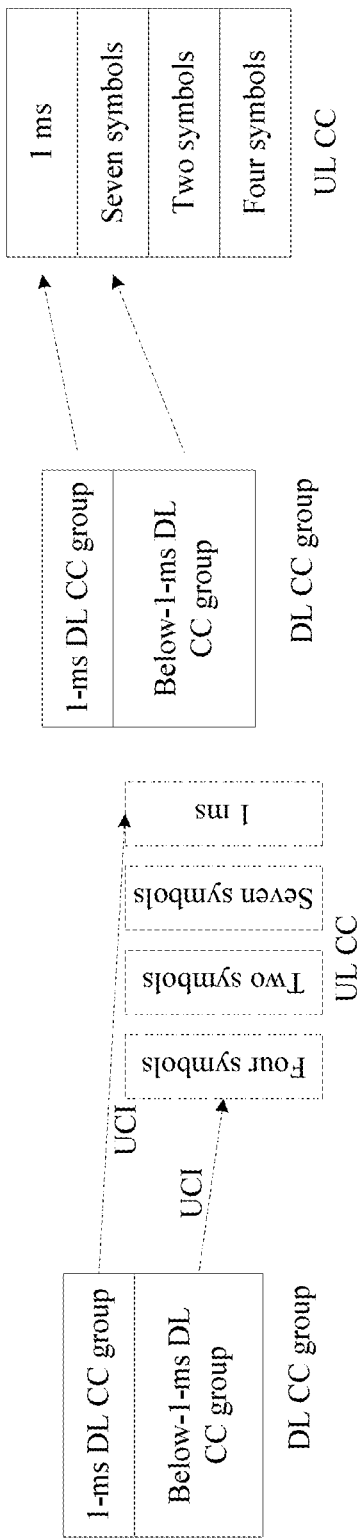
FIG. 6 is a schematic diagram of yet another UCI transmission manner according to an embodiment of the present invention.

For example, FIG. 6 is a schematic diagram of yet another UCI transmission manner according to an embodiment of the present invention. As shown in FIG. 6, the DL CCs are grouped into the below-1-ms DL CC group and the 1-ms DL CC group, and UCI corresponding to each DL CC group is separately sent by using UL CCs having different transmission lengths.

Operation 204. The base station performs processing based on the UCI.

In this embodiment, after receiving the UCI sent by the terminal device, when the UCI includes the HARQ, the base station needs to first determine whether the HARQ is HARQ acknowledgement (ACK) information or HARQ negative acknowledgement (NACK) information. When the HARQ is HARQ ACK information, it indicates that information sent by the base station is received by the terminal device, and the base station does not need to retransmit the information to the terminal device; or when the HARQ is HARQ NACK information, it indicates that information sent by the base station is not received by the terminal device, and the base station needs to send the information to the terminal device again.

When the UCI includes the CSI, the base station determines a transmission parameter, a modulation and coding scheme (MCS), a precoding matrix, and a quantity of transport layers; and sends the transmission parameter, the modulation and coding scheme, the precoding matrix, and the quantity of transport layers to the terminal device.

When the UCI includes the SR, the base station allocates a UL-SCH resource to the terminal device, and sends information about the allocated UL-SCH resource to the terminal device.

In an embodiment, the base station may send information about scheduled CCs to the terminal device, so that the terminal device knows which CCs are scheduled by the base station, and may receive, by using the scheduled CCs, information sent by the base station.

In an embodiment, the base station may alternatively receive information about scheduled CCs that is sent by the terminal device, so that the base station knows which CCs are scheduled by the terminal device, and may receive, by using the scheduled CCs, information sent by the terminal device.

In the information processing method shown in FIG. 2, the DL CCs are grouped based on the DL transmission length, and the UCI is sent based on the grouped DL CCs by using the UL CC, but not sent by using a UL CC having a fixed length of 1 ms. This can reduce an information transmission delay.

Figure 7:
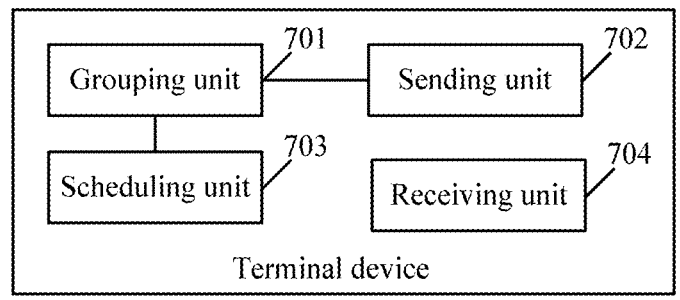
FIG. 7 is a schematic structural diagram of a terminal device according to an embodiment of the present invention.

Based on the network architecture shown in FIG. 1, FIG. 7 is a schematic structural diagram of a terminal device according to an embodiment of the present invention. As shown in FIG. 7, the terminal device may include:

a grouping unit 701, configured to group DL CCs based on a DL transmission length; and a sending unit 702, configured to send UCI by using a UL CC based on grouped DL CCs obtained by the grouping unit 701, where the UCI is UCI corresponding to the grouped DL CCs, and transmission lengths of DL CCs in at least one DL CC group of the grouped DL CCs are all the same.

In a possible embodiment, the terminal device may further include:

a scheduling unit 703, configured to schedule a CC based on the grouped DL CCs obtained by the grouping unit 701.

In a possible embodiment, the grouping unit 701 is configured to group DL CCs having different DL transmission lengths into different DL CC groups; and when TDM is used for UL CCs having different transmission lengths, the sending unit 702 is specifically configured to separately send, by using different transmission opportunities in a first UL CC, UCI corresponding to the different DL CC groups, where the first UL CC is a UL CC having a smallest transmission length in UL CCs whose capacity is greater than or equal to a first capacity, and the first capacity is a capacity of UCI corresponding to each of the different DL CC groups.

In a possible embodiment, the sending unit 702 is further configured to: discard information whose priority is lower than a first preset value in UCI corresponding to each of the different DL CC groups or M pieces of information with one or more lowest priorities in the UCI corresponding to each of the different DL CC groups; and separately send, by using different transmission opportunities in a second UL CC, remaining UCI corresponding to the different DL CC groups, where the second UL CC is a UL CC having a smallest transmission length in UL CCs whose capacity is greater than or equal to a second capacity, the second capacity is a capacity of the remaining UCI corresponding to each of the different DL CC groups, and M is an integer greater than or equal to 1.

In a possible embodiment, the grouping unit 701 is configured to group DL CCs having different DL transmission lengths into different DL CC groups; and when frequency division multiplexing FDM is used for UL CCs having different transmission lengths, the sending unit 702 is specifically configured to: when a capacity of a third UL CC is greater than or equal to a capacity of UCI corresponding to a first DL CC group, send, by using the third UL CC, the UCI corresponding to the first DL CC group, where the first DL CC group is any one of the different DL CC groups, and the third UL CC is a UL CC that has a same transmission length as the first DL CC group.

In a possible embodiment, the sending unit 702 is further configured to: when the capacity of the third UL CC is less than the capacity of the UCI corresponding to the first DL CC group, discard information whose priority is lower than a second preset value in the UCI corresponding to the first DL CC group or N pieces of information with one or more lowest priorities in the UCI corresponding to the first DL CC group; and send, by using the third UL CC, remaining UCI corresponding to the first DL CC group, where N is an integer greater than or equal to 1.

In a possible embodiment, the grouping unit 701 is configured to group DL CCs having different DL transmission lengths into different DL CC groups; and the sending unit 702 is specifically configured to: send, by using one transmission opportunity in a fourth UL CC, UCI corresponding to the different DL CC groups, where the fourth UL CC is a UL CC having a smallest transmission length in UL CCs whose capacity is greater than or equal to a third capacity, and the third capacity is a total capacity of the UCI corresponding to the different DL CC groups.

In a possible embodiment, the sending unit 702 is further configured to: sort, in descending order of priorities, information in the UCI corresponding to each of the different DL CC groups; discard K pieces of information in the UCI corresponding to each of the different DL CC groups, where the K pieces of information are of one or more lowest priorities or their priorities are lower than a third preset value; and send, by using one transmission opportunity in a fifth UL CC, remaining UCI corresponding to the different DL CC groups. The fifth UL CC is a UL CC having a smallest transmission length in UL CCs whose capacity is greater than or equal to a fourth capacity. The fourth capacity is a total capacity of the remaining UCI corresponding to the different DL CC groups. K is an integer greater than or equal to 1.

In a possible embodiment, the sending unit 702 is further configured to: discard at least one DL CC group having a lowest priority in the different DL CC groups; and send, by using one transmission opportunity in a sixth UL CC, UCI corresponding to a remaining DL CC group in the different DL CC groups. The sixth UL CC is a UL CC having a smallest transmission length in UL CCs whose capacity is greater than or equal to a fifth capacity. The fifth capacity is a total capacity of the UCI corresponding to the remaining DL CC group in the different DL CC groups.

In a possible embodiment, the grouping unit 701 is configured to: determine a DL CC whose DL transmission length is 1 ms as a second DL CC group, and determine a DL CC whose DL transmission length is less than 1 ms as a third DL CC group; and the sending unit 702 is specifically configured to: send, by using a seventh UL CC, UCI corresponding to the second DL CC group, and send, by using an eighth UL CC, UCI corresponding to the third DL CC group, where a capacity of the seventh UL CC is greater than or equal to a capacity of the UCI corresponding to the second DL CC group, and a capacity of the eighth UL CC is greater than or equal to a capacity of the UCI corresponding to the third DL CC group.

In a possible embodiment, the grouping unit 701 is configured to group DL CCs having different DL transmission lengths into different DL CC groups;

the scheduling unit 703 is specifically configured to schedule a CC from a DL CC group to which a DL CC corresponding to a target cell belongs, where the target cell is any one of cells allocated to the terminal device; and the sending unit 702 is further configured to send, to a base station, information about the CC scheduled by the scheduling unit 703.

The terminal device may further include:

a receiving unit 704, configured to receive information about a scheduled CC that is sent by the base station.

In a possible embodiment, the UCI may include at least one of an SR, a HARQ, and CSI.

According to the terminal device shown in FIG. 7, the DL CCs are grouped based on the DL transmission length, and the UCI is sent based on the grouped DL CCs by using the UL CC, but not sent by using a UL CC having a fixed length of 1 ms. This can reduce an information transmission delay.

Figure 8:
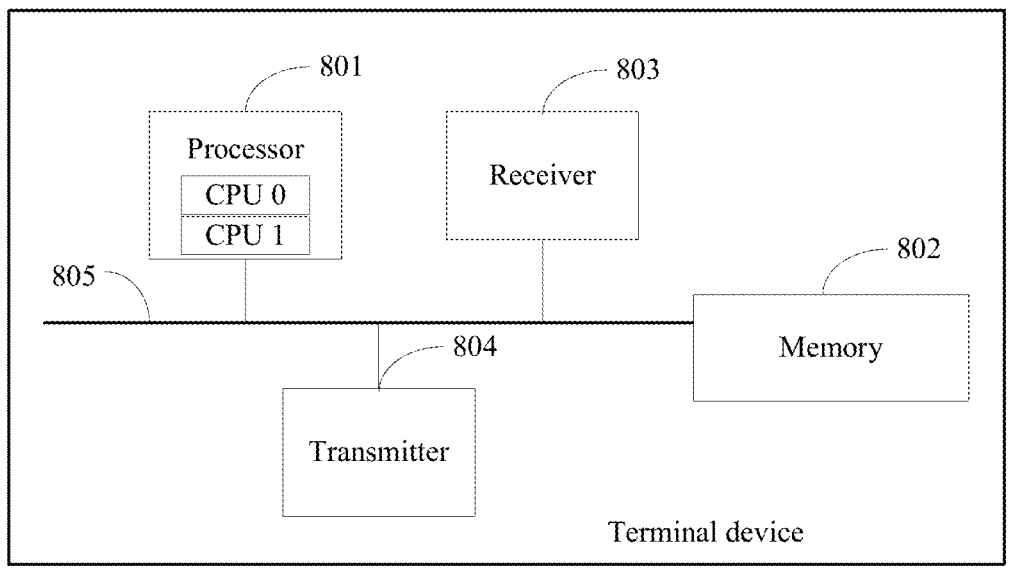
FIG. 8 is a schematic structural diagram of another terminal device according to an embodiment of the present invention.

Based on the network architecture shown in FIG. 1, FIG. 8 is a schematic structural diagram of another terminal device according to an embodiment of the present invention. As shown in FIG. 8, the terminal device may include a processor 801, a memory 802, a receiver 803, a transmitter 804, and a bus 805. The processor 801 may be a general-purpose central processing unit (CPU), a plurality of CPUs, a microprocessor, an application-specific integrated circuit (application-specific integrated circuit, ASIC), or one or more integrated circuits configured to control program execution of the solutions of the present invention. The memory 802 may be a read-only memory (Read-Only Memory, ROM), another type of static storage device capable of storing static information and an instruction, a random access memory (random access memory, RAM), or another type of dynamic storage device capable of storing information and an instruction; or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), or a magnetic disk storage medium or another magnetic storage device, or any other medium that can carry or store expected program code in a form of an instruction or a data structure and that can be accessed by a computer, but this is not limited herein. The memory 802 may exist independently, and is connected to the processor 801 by using the bus 805. Alternatively, the memory 802 may be integrated with the processor 801. The receiver 803 and the transmitter 804 are configured to communicate with another device or a communications network, such as Ethernet, a radio access network (RAN), or a wireless local area network (Wireless Local Area Network, WLAN). The bus 805 may include a channel, to transmit information between the foregoing components.

Operation 201 and operation 202 may be performed by the processor 801 and the memory 802 in the terminal device. Operation 203 may be performed by the transmitter 804 in the terminal device. An operation of receiving information by the terminal device may be performed by the receiver 803 in the terminal device. The grouping unit 701 and the scheduling unit 703 may be implemented by the processor 801 and the memory 802 in the terminal device. The sending unit 702 may be implemented by the transmitter 804 in the terminal device. The receiving unit 704 may be implemented by the receiver 803 in the terminal device.

Figure 9:
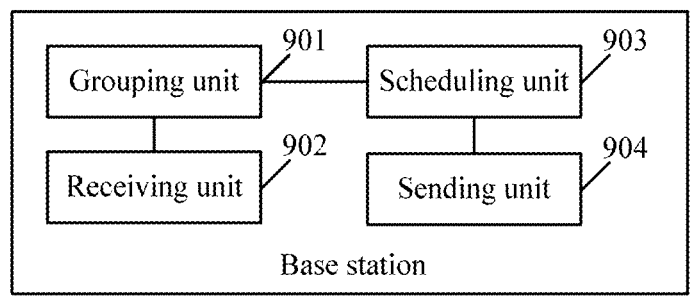
FIG. 9 is a schematic structural diagram of a base station according to an embodiment of the present invention.

Based on the network architecture shown in FIG. 1, FIG. 9 is a schematic structural diagram of a base station according to an embodiment of the present invention. As shown in FIG. 9, the base station may include:

a grouping unit 901 configured to group DL CCs based on a DL transmission length; and a receiving unit 902 configured to receive UCI sent by a terminal device.

The UCI is UCI corresponding to grouped DL CCs obtained by the grouping unit 901. Transmission lengths of DL CCs in at least one DL CC group of the grouped DL CCs are all the same.

In a possible embodiment, the base station may further include:

a scheduling unit 903 configured to schedule a CC based on the grouped DL CCs obtained by the grouping unit 901.

In a possible embodiment, the grouping unit 901 is configured to group DL CCs having different DL transmission lengths into different DL CC groups; and when TDM is used for UL CCs having different transmission lengths, the receiving unit 902 is specifically configured to receive UCI that corresponds to the different DL CC groups and that is separately sent by the terminal device by using different transmission opportunities in a first UL CC, where the first UL CC is a UL CC having a smallest transmission length in UL CCs whose capacity is greater than or equal to a first capacity, and the first capacity is a capacity of UCI corresponding to each of the different DL CC groups.

In a possible embodiment, the receiving unit 902 is further configured to receive a part of UCI that corresponds to the different DL CC groups and that is separately sent by the terminal device by using different transmission opportunities in a second UL CC, where the second UL CC is a UL CC having a smallest transmission length in UL CCs whose capacity is greater than or equal to a second capacity, the second capacity is a capacity of remaining UCI corresponding to each of the different DL CC groups, and the part of UCI corresponding to the different DL CC groups is obtained after the terminal device discards information whose priority is lower than a first preset value in UCI corresponding to each of the different DL CC groups or M pieces of information with one or more lowest priorities in UCI corresponding to each of the different DL CC groups, where M is an integer greater than or equal to 1.

In a possible embodiment, the grouping unit 901 is configured to group DL CCs having different DL transmission lengths into different DL CC groups; and when FDM is used for UL CCs having different transmission lengths, the receiving unit 902 is specifically configured to receive UCI that corresponds to a first DL CC group and that is sent by the terminal device by using a third UL CC, where a capacity of the third UL CC is greater than or equal to a capacity of the UCI corresponding to the first DL CC group, the first DL CC group is any one of the different DL CC groups, and a transmission length of the third UL CC is the same as a transmission length of the first DL CC group.

In a possible embodiment, the receiving unit 903 is further configured to receive a part of UCI that corresponds to a first DL CC group and that is sent by the terminal device by using a third UL CC, where a capacity of the third UL CC is less than a capacity of the UCI corresponding to the first DL CC group, the part of UCI is obtained after the terminal device discards information whose priority is lower than a second preset value in the UCI corresponding to the first DL CC group or N pieces of information with one or more lowest priorities in the UCI corresponding to the first DL CC group, and N is an integer greater than or equal to 1.

In a possible embodiment, the grouping unit 901 is configured to group DL CCs having different DL transmission lengths into different DL CC groups; and the receiving unit 903 is specifically configured to receive UCI that corresponds to the different DL CC groups and that is sent by the terminal device by using one transmission opportunity in a fourth UL CC, where the fourth UL CC is a UL CC having a smallest transmission length in UL CCs whose capacity is greater than or equal to a third capacity, and the third capacity is a total capacity of the UCI corresponding to the different DL CC groups.

In a possible embodiment, the receiving unit 902 is further configured to receive a part of UCI that corresponds to the different DL CC groups and that is sent by the terminal device by using one transmission opportunity in a fifth UL CC, where the part of UCI corresponding to the different DL CC groups is obtained after the terminal device sorts, in descending order of priorities, information in UCI corresponding to each of the different DL CC groups, and discards K pieces of information in the UCI corresponding to each of the different DL CC groups, where the K pieces of information are of one or more lowest priorities or their priorities are lower than a third preset value. The fifth UL CC is a UL CC having a smallest transmission length in UL CCs whose capacity is greater than or equal to a fourth capacity. The fourth capacity is a total capacity of the part of UCI corresponding to the different DL CC groups. K is an integer greater than or equal to 1.

In a possible embodiment, the receiving unit 902 is further configured to receive UCI that corresponds to some DL CC groups in the different DL CC groups and that is sent by the terminal device by using one transmission opportunity in a sixth UL CC, where the some DL CC groups are obtained after the terminal device discards at least one DL CC group having a lowest priority in the different DL CC groups. The sixth UL CC is a UL CC having a smallest transmission length in UL CCs whose capacity is greater than or equal to a fifth capacity. The fifth capacity is a total capacity of the UCI corresponding to the some DL CC groups.

In a possible embodiment, the grouping unit 901 is configured to: determine a DL CC whose DL transmission length is 1 ms as a second DL CC group, and determine a DL CC whose DL transmission length is less than 1 ms as a third DL CC group; and the receiving unit 902 is specifically configured to: receive UCI that corresponds to the second DL CC group and that is sent by the terminal device by using a seventh UL CC, and receive UCI that corresponds to the third DL CC group and that is sent by the terminal device by using an eighth UL CC, where a capacity of the seventh UL CC is greater than or equal to a capacity of the UCI corresponding to the second DL CC group, and a capacity of the eighth UL CC is greater than or equal to a capacity of the UCI corresponding to the third DL CC group.

In a possible embodiment, the grouping unit 901 is configured to group DL CCs having different DL transmission lengths into different DL CC groups; and the scheduling unit 903 is specifically configured to schedule a CC from a DL CC group to which a DL CC corresponding to a target cell belongs, where the target cell is any one of cells allocated to the terminal device.

The base station may further include:

a sending unit 904, configured to send information about the CC scheduled by the scheduling unit 903.

In a possible embodiment, the UCI may include at least one of an SR, a HARQ, and CSI.

Figure 10:
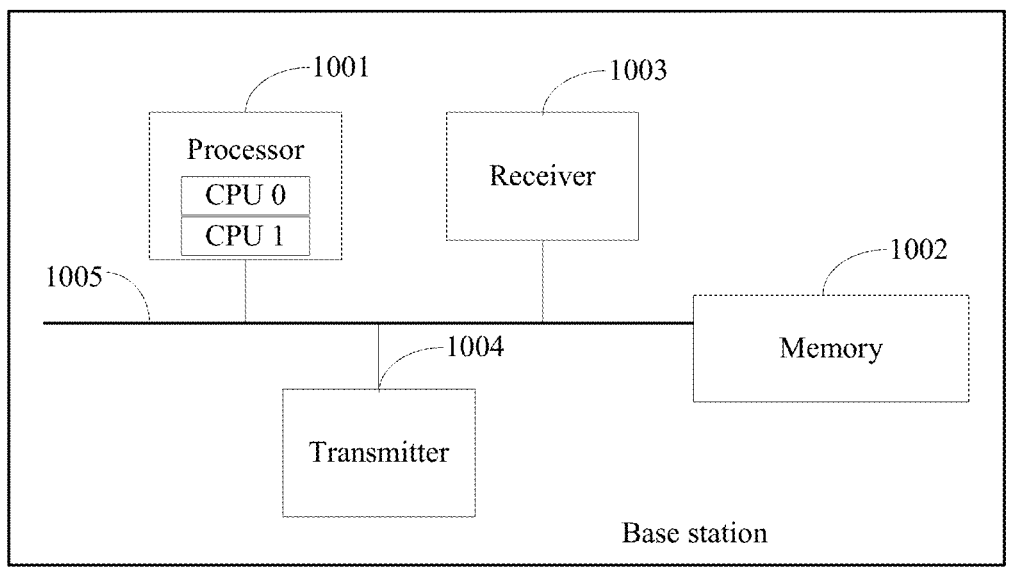
FIG. 10 is a schematic structural diagram of another base station according to an embodiment of the present invention.

Based on the network architecture shown in FIG. 1, FIG. 10 is a schematic structural diagram of another base station according to an embodiment of the present invention. As shown in FIG. 10, the base station may include a processor 1001, a memory 1002, a receiver 1003, a transmitter 1004, and a bus 1005. The processor 1001 may be a general-purpose central processing unit (CPU), a plurality of CPUs, a microprocessor, an application-specific integrated circuit (ASIC), or one or more integrated circuits configured to control program execution of the solutions of the present invention. The memory 1002 may be a read-only memory (ROM), another type of static storage device capable of storing static information and an instruction, a random access memory (RAM), or another type of dynamic storage device capable of storing information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), or a magnetic disk storage medium or another magnetic storage device, or any other medium that can carry or store expected program code in a form of an instruction or a data structure and that can be accessed by a computer, but this is not limited herein. The memory 1002 may exist independently, and is connected to the processor 1001 by using the bus 1005. Alternatively, the memory 1002 may be integrated with the processor 1001. The receiver 1003 and the transmitter 1004 are configured to communicate with another device or a communications network, such as Ethernet, a radio access network (RAN), or a wireless local area network (WLAN). The bus 1005 may include a channel, to transmit information between the foregoing components.

Operation 204 may be performed by the processor 1001 and the memory 1002 in the base station. Receiving, by the base station, UCI sent by a terminal device may be performed by the receiver 1003 in the base station. Sending, by the base station, information to the terminal device may be performed by the transmitter 1004 in the base station. The grouping unit 901 and the scheduling unit 903 may be implemented by the processor 1001 and the memory 1002 in the base station. The receiving unit 902 may be implemented by the receiver 1003 in the base station. The sending unit 904 may be implemented by the transmitter 1004 in the base station.

An embodiment of the present invention further discloses a readable storage medium. The readable storage medium stores program code used by a terminal device and a base station to perform the information processing method shown in FIG. 2.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, a compact disc, a read-only memory (Read-Only Memory, ROM), a random access memory (Random Access Memory, RAM), or the like.

The information processing method and the device provided in the embodiments of the present invention are described in detail above. The principle and implementations of the present invention are described herein by using specific examples. The description about the embodiments is merely used to help understand the method and core ideas of the present invention. In addition, a person of ordinary skill in the art can make variations and modifications to the present invention in terms of the specific implementations and application scopes according to the ideas of the present invention. Therefore, the content of this specification shall not be construed as a limitation to the present invention.

What is claimed is:

1. An information processing method performed in a terminal device, the method comprising:
grouping DL component carriers (CCs) based on a downlink (DL) transmission length; and
sending uplink control information (UCI) based on grouped DL CCs using an uplink (UL) CC, wherein the UCI corresponds to the grouped DL CCs, and transmission lengths of DL CCs in at least one DL CC group of the grouped DL CCs are the same.

2. The method according to claim 1, wherein the grouping DL CCs based on a DL transmission length comprises:
grouping DL CCs having different DL transmission lengths into different DL CC groups; and
wherein when time division multiplexing (TDM) is used for UL CCs having different transmission lengths, the sending UCI based on grouped DL CCs using a UL CC comprises:
separately sending, using different transmission opportunities in a first UL CC, UCI corresponding to the different DL CC groups, wherein the first UL CC has a smallest transmission length in the UL CCs whose capacity is greater than or equal to a first capacity, and the first capacity is a capacity of UCI corresponding to each of the different DL CC groups.

3. The method according to claim 2, wherein the sending UCI based on grouped DL CCs by using a UL CC further comprises:
discarding information whose priority is lower than a first preset value in the UCI corresponding to each of the different DL CC groups or M pieces of information with one or more lowest priorities in the UCI corresponding to each of the different DL CC groups; and
separately sending, using different transmission opportunities in a second UL CC, remaining UCI corresponding to the different DL CC groups, wherein the second UL CC has a smallest transmission length in the UL CCs whose capacity is greater than or equal to a second capacity, the second capacity is a capacity of the remaining UCI corresponding to each of the different DL CC groups, and M is an integer greater than or equal to 1.

4. The method according to claim 1, wherein the grouping DL CCs based on a DL transmission length comprises:
grouping DL CCs having different DL transmission lengths into different DL CC groups; and
wherein when frequency division multiplexing (FDM) is used for UL CCs having different transmission lengths, the sending UCI based on grouped DL CCs using a UL CC comprises:
when a capacity of a third UL CC is greater than or equal to a capacity of UCI corresponding to a first DL CC group, sending, using the third UL CC, the UCI corresponding to the first DL CC group, wherein the first DL CC group is any one of the different DL CC groups, and the third UL CC is a UL CC that has a same transmission length as the first DL CC group.

5. The method according to claim 1, wherein the grouping DL CCs based on a DL transmission length comprises:
grouping DL CCs having different DL transmission lengths into different DL CC groups; and
wherein the sending UCI based on grouped DL CCs using a UL CC comprises:
sending, using a transmission opportunity in a fourth UL CC, UCI corresponding to the different DL CC groups, wherein the fourth UL CC has a smallest transmission length in UL CCs whose capacity is greater than or equal to a third capacity, and the third capacity is a total capacity of the UCI corresponding to the different DL CC groups.

6. The method according to claim 5, wherein the sending UCI based on grouped DL CCs using a UL CC further comprises:
sorting, in a descending order of priorities, information in UCI corresponding to each of the different DL CC groups;
discarding K pieces of information in the UCI corresponding to each of the different DL CC groups, wherein the K pieces of information are of one or more lowest priorities or their priorities are lower than a third preset value; and sending, using one transmission opportunity in a fifth UL CC, remaining UCI corresponding to the different DL CC groups, wherein the fifth UL CC has a smallest transmission length in the UL CCs whose capacity is greater than or equal to a fourth capacity, the fourth capacity is a total capacity of the remaining UCI corresponding to the different DL CC groups, and K is an integer greater than or equal to 1.

7. The method according to claim 5, wherein the sending UCI based on grouped DL CCs by using a UL CC further comprises:
   discarding at least one DL CC group having a lowest priority in the different DL CC groups; and
   sending, using one transmission opportunity in a sixth UL CC, UCI corresponding to a remaining DL CC group in the different DL CC groups, wherein the sixth UL CC has a smallest transmission length in the UL CCs whose capacity is greater than or equal to a fifth capacity, and the fifth capacity is a total capacity of the UCI corresponding to the remaining DL CC group in the different DL CC groups.

8. A terminal device, comprising:
   a processor configured to group downlink (DL) component carriers (CCs) based on a DL transmission length; and
   a transmitter configured to send uplink control information (UCI) using an uplink (UL) CC based on grouped DL CCs obtained by a grouping unit, wherein the UCI corresponds to the grouped DL CCs, and transmission lengths of DL CCs in at least one DL CC group of the grouped DL CCs are all the same.

9. The terminal device according to claim 8, wherein the processor is configured to group DL CCs having different DL transmission lengths into different DL CC groups; and
   wherein when time division multiplexing (TDM) is used for UL CCs having different transmission lengths, the processor is configured to separately send, using different transmission opportunities in a first UL CC, UCI corresponding to the different DL CC groups, wherein the first UL CC has a smallest transmission length in the UL CCs whose capacity is greater than or equal to a first capacity, and the first capacity is a capacity of UCI corresponding to each of the different DL CC groups.

10. The terminal device according to claim 9, wherein the transmitter is further configured to:
    discard information whose priority is lower than a first preset value in UCI corresponding to each of the different DL CC groups or M pieces of information with one or more lowest priorities in the UCI corresponding to each of the different DL CC groups; and
    separately send, using different transmission opportunities in a second UL CC, remaining UCI corresponding to the different DL CC groups, wherein the second UL CC has a smallest transmission length in the UL CCs whose capacity is greater than or equal to a second capacity, the second capacity is a capacity of the remaining UCI corresponding to each of the different DL CC groups, and M is an integer greater than or equal to 1.

11. The terminal device according to claim 8, wherein the processor is configured to group DL CCs having different DL transmission lengths into different DL CC groups; and
    wherein when frequency division multiplexing (FDM) is used for UL CCs having different transmission lengths, the transmitter is configured to:
    when a capacity of a third UL CC is greater than or equal to a capacity of UCI corresponding to a first DL CC group, send, using the third UL CC, the UCI corresponding to the first DL CC group, wherein the first DL CC group is any one of the different DL CC groups, and the third UL CC is a UL CC that has a same transmission length as the first DL CC group.

12. The terminal device according to claim 8, wherein the processor is configured to group DL CCs having different DL transmission lengths into different DL CC groups; and
    wherein the transmitter is specifically configured to send, using one transmission opportunity in a fourth UL CC, UCI corresponding to the different DL CC groups, wherein the fourth UL CC has a smallest transmission length in UL CCs whose capacity is greater than or equal to a third capacity, and the third capacity is a total capacity of the UCI corresponding to the different DL CC groups.

13. The terminal device according to claim 12, wherein the transmitter is further configured to:
    sort, in a descending order of priorities, information in UCI corresponding to each of the different DL CC groups;
    discard K pieces of information in the UCI corresponding to each of the different DL CC groups, wherein the K pieces of information are of one or more lowest priorities or their priorities are lower than a third preset value; and
    send, using one transmission opportunity in a fifth UL CC, remaining UCI corresponding to the different DL CC groups, wherein the fifth UL CC is a UL CC having a smallest transmission length in the UL CCs whose capacity is greater than or equal to a fourth capacity, the fourth capacity is a total capacity of the remaining UCI corresponding to the different DL CC groups, and K is an integer greater than or equal to 1.

14. The terminal device according to claim 12, wherein the transmitter is further configured to:
    discard at least one DL CC group having a lowest priority in the different DL CC groups; and
    send, using one transmission opportunity in a sixth UL CC, UCI corresponding to a remaining DL CC group in the different DL CC groups, wherein the sixth UL CC has a smallest transmission length in the UL CCs whose capacity is greater than or equal to a fifth capacity, and the fifth capacity is a total capacity of the UCI corresponding to the remaining DL CC group in the different DL CC groups.

15. A non-transitory computer readable storage medium, comprising computer program codes which when executed by a processor cause the processor to perform operations, the operations including:
    grouping DL component carriers (CCs) based on a downlink (DL) transmission length; and
    sending uplink control information (UCI) based on grouped DL CCs using an uplink UL CC, wherein the UCI corresponds to the grouped DL CCs, and transmission lengths of DL CCs in at least one DL CC group of the grouped DL CCs are the same.

16. The non-transitory computer readable storage medium according to claim 15, wherein the grouping DL CCs based on a DL transmission length comprises:
    grouping DL CCs having different DL transmission lengths into different DL CC groups; and wherein when time division multiplexing (TDM) is used for UL CCs having different transmission lengths, the sending UCI based on grouped DL CCs using a UL CC comprises:
separately sending, using different transmission opportunities in a first UL CC, UCI corresponding to the different DL CC groups, wherein the first UL CC has a smallest transmission length in the UL CCs whose capacity is greater than or equal to a first capacity, and the first capacity is a capacity of UCI corresponding to each of the different DL CC groups.

17. The non-transitory computer readable storage medium according to claim 16, wherein the sending UCI based on grouped DL CCs by using a UL CC further comprises:
discarding information whose priority is lower than a first preset value in the UCI corresponding to each of the different DL CC groups or M pieces of information with one or more lowest priorities in the UCI corresponding to each of the different DL CC groups; and
separately sending, using different transmission opportunities in a second UL CC, remaining UCI corresponding to the different DL CC groups, wherein the second UL CC has a smallest transmission length in the UL CCs whose capacity is greater than or equal to a second capacity, the second capacity is a capacity of the remaining UCI corresponding to each of the different DL CC groups, and M is an integer greater than or equal to 1.

18. The non-transitory computer readable storage medium according to claim 15, wherein the grouping DL CCs based on a DL transmission length comprises:
grouping DL CCs having different DL transmission lengths into different DL CC groups; and
wherein when frequency division multiplexing (FDM) is used for UL CCs having different transmission lengths, the sending UCI based on grouped DL CCs using a UL CC comprises:
when a capacity of a third UL CC is greater than or equal to a capacity of UCI corresponding to a first DL CC group, sending, using the third UL CC, the UCI corresponding to the first DL CC group, wherein the first DL CC group is any one of the different DL CC groups, and the third UL CC is a UL CC that has a same transmission length as the first DL CC group.

19. The non-transitory computer readable storage medium according to claim 15, wherein the grouping DL CCs based on a DL transmission length comprises:
grouping DL CCs having different DL transmission lengths into different DL CC groups; and
wherein the sending UCI based on grouped DL CCs by using a UL CC comprises:
sending, using one transmission opportunity in a fourth UL CC, UCI corresponding to the different DL CC groups, wherein the fourth UL CC has a smallest transmission length in UL CCs whose capacity is greater than or equal to a third capacity, and the third capacity is a total capacity of the UCI corresponding to the different DL CC groups.

20. The method according to claim 19, wherein the sending UCI based on grouped DL CCs using a UL CC further comprises:
sorting, in a descending order of priorities, information in UCI corresponding to each of the different DL CC groups;
discarding K pieces of information in the UCI corresponding to each of the different DL CC groups, wherein the K pieces of information are of one or more lowest priorities or their priorities are lower than a third preset value; and
sending, using one transmission opportunity in a fifth UL CC, remaining UCI corresponding to the different DL CC groups, wherein the fifth UL CC has a smallest transmission length in the UL CCs whose capacity is greater than or equal to a fourth capacity, the fourth capacity is a total capacity of the remaining UCI corresponding to the different DL CC groups, and K is an integer greater than or equal to 1.

* * * * *